United States Patent [19]

Oikawa

[11] Patent Number: 4,953,801
[45] Date of Patent: Sep. 4, 1990

[54] CLIP

[75] Inventor: Ryuetsu Oikawa, Kosai, Japan

[73] Assignee: Yazaki Corporation, Tokyo, Japan

[21] Appl. No.: 261,898

[22] Filed: Oct. 25, 1988

[30] Foreign Application Priority Data

Oct. 28, 1987 [JP] Japan .............................. 62-164734[U]

[51] Int. Cl.⁵ ................................................ F16L 3/08
[52] U.S. Cl. ............................................ 248/65; 248/60
[58] Field of Search ................... 248/65, 50, 60, 72, 248/104, 316.7, 231.91

[56] References Cited

U.S. PATENT DOCUMENTS

| | | | |
|---|---|---|---|
| 1,861,532 | 6/1932 | Hough | 248/50 X |
| 2,267,431 | 12/1941 | Steensen | 248/60 |
| 2,854,824 | 10/1958 | Curry et al. | 248/231.91 X |
| 2,923,510 | 2/1960 | Walch | 248/68.1 |
| 3,264,405 | 8/1966 | Fiero | 248/65 X |
| 3,794,751 | 2/1974 | Farmer et al. | 248/65 X |
| 4,666,109 | 5/1987 | Fallon et al. | 248/50 |
| 4,787,591 | 11/1988 | Villacorta | 248/316.7 X |

FOREIGN PATENT DOCUMENTS 59-115181 1/1983 Japan .

Primary Examiner—Karen J. Chotkowski
Attorney, Agent, or Firm—Venable, Batejer and Howard

[57] ABSTRACT

A clip of T-shape molded from a polymer material has a holder portion for securely holding an associated wiring harness longitudinal and a retainer portion for securing the clip in position within its mounting room specified in an automobile. Both of the two portions are integral with each other through a bridging or middle portion. The bridging portion is formed with vertical recesses on its both sides, tapered in profile, formed hollow, or otherwise formed in a manner to reduce its mass. The harness-clip assembly, when fitting into its mounting room through a hole on the enclosure panel, can conveniently be bent resiliently with a resultant reduction in the overall transverse dimension of the assembly. This assures very easy procedure of wiring harness mounting without the necessity of otherwise providing a large-diameter hole on the panel, attaining economy in respect of cost and man-hour required in the fabrication of necessary parts or actual mounting procedure.

12 Claims, 3 Drawing Sheets

CLIP

BACKGROUND OF THE INVENTION

1. Field of the Invention

The present invention relates to an improvement on a clip for holding a wiring harness secured in position within its respective mounting room in an automobile, for example, as prescribed on the wiring diagram, and more particularly to a clip of the type specified featuring a significantly improved procedure of its mounting.

2. Description of the Prior Art

There has conventionally been used in an automobile, for example, a clip for holding a wiring harness of bundled wires for current supply and securely mounting it in position within its mounting room or space as prescribed in the wiring design. The clip usually is T-shaped in general configuration consisting of a holder head portion which is adapted to make intimate contact longitudianlly with the wiring harness and an elongate retainer stem portion which is adapted to be fixedly secured within its mounting room by use of a fastening bolt, or the like.

For mounting of the wiring harness, the clip is bound to the wiring harness with its holder head in close contact with the outer periphery of the wiring harness, by a tightly wound fastening tape or by a fastening strap around the two members. This assembly is then brought into its mounting room, and is fixed in position by securing the retainer stem of the clip on a fixed part of the car body structure or a panel closing the mounting room, through a fastening bolt or its like.

However, the problem which usually occurs in this operation of mounting the wiring harness is that because the overall transverse dimension of the wiring harness-clip assembly is considerably great, the closure panel defining the mounting room has to be provided with a correspondingly large-diameter hole through which the assembly is to be inserted. Hence, several difficulties have been met in that the provision of such large-diameter hole in the closure panel may result in deterioration of strength of the panel or associated structural part, the subsequent use of a correspondingly large-diameter blind member for that hole is necessitated, and if the hole is selected small, the insertion of the clip may turn out troublesome, which requiring extra cost and man-hour in the mounting procedure.

To avoid these difficulties, it is necessary to first apply the clip alone into its mounting room for secure fixing there and subsequently bring the wiring harness to the holder head portion of the clip for firmly binding the two members together. This procedure also is complicated.

In either case, therefore, the actual use of the prior art clip involves uneconomy in respect of cost and man-hour in the mounting procedure.

SUMMARY OF THE INVENTION

Therefore, the invention has been devised with a view to obviate the above described problems in the prior art clip. It is aimed primarily to provide a clip of the type which improves its mounting procedure and which enables easy mounting through a small-diameter hole on the closure panel defining the mounting room.

According to a feature of the present invention, there is provided a clip of the type being of T-shape and including a trough-shaped holder head portion for intimate support of a wiring harness longitudinally and a retainer stem portion for securing the clip in position within a mounting room, both of which portions being formed integral with each other with a bridging portion formed thereebeteween, wherein the bridging portion is provided with a resiliently bendable portion which can be bent in directions substantially parallel to the holder head portion.

According to the clip of the invention, it is made possible, by virtue of its excellent incorporability into its mounting room, to insert the wiring harness-clip assembly with ease even through a small-diameter hole. Thus, it is assured that those economic drawbacks as the disadvantages of necessarily selecting a large-diameter through-hole on the closure panel or of involving increased man-hours for the mounting procedure, can be totally eliminated.

The above and other objects, features and advantages of the present invention will become clear from the following description of the preferred embodiment when the same is read in conjunction with the accompanying drawings.

DESCRIPTION OF THE PREFERRED EMBODIMENTS

Figure 5:
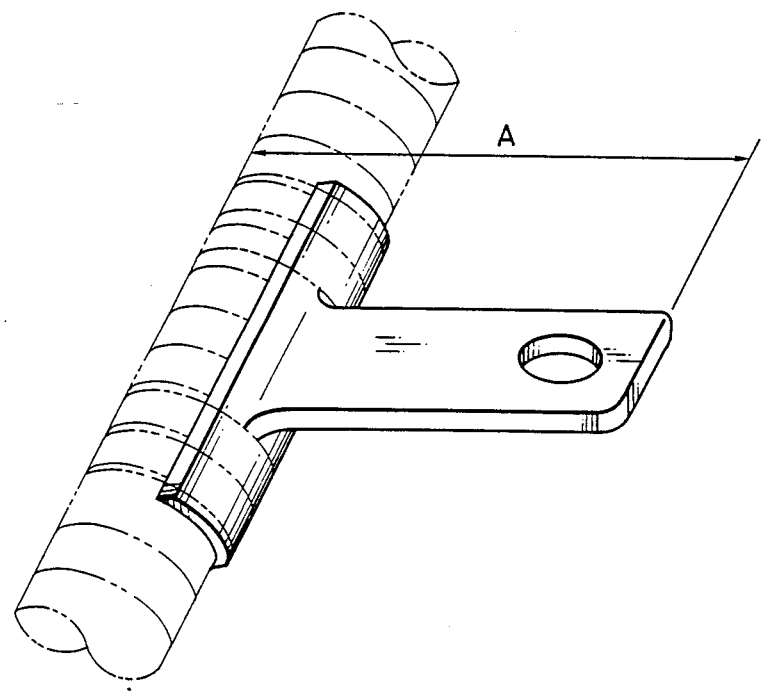
FIG. 5 is a perspective schematic view of the conventional clip.

Before describing the present invention, reference will be made to FIG. 5 showing a conventional clip wherein the assembly of wiring harness and clip provided as mentioned hereinbefore has an overall transverse dimension A which is considerably great. Due to this elongate transversal extent of the assembly, the closure panel, for example, has to be provided with a hole of diameter greater than A through which the assembly can be inserted. Difficulties may result in the mounting process, as mentioned hereinbefore.

Now, the clip which has been devised in an effort to solve the problem will be described in detail with reference to FIGS. 1 through 4.

Figure 1:
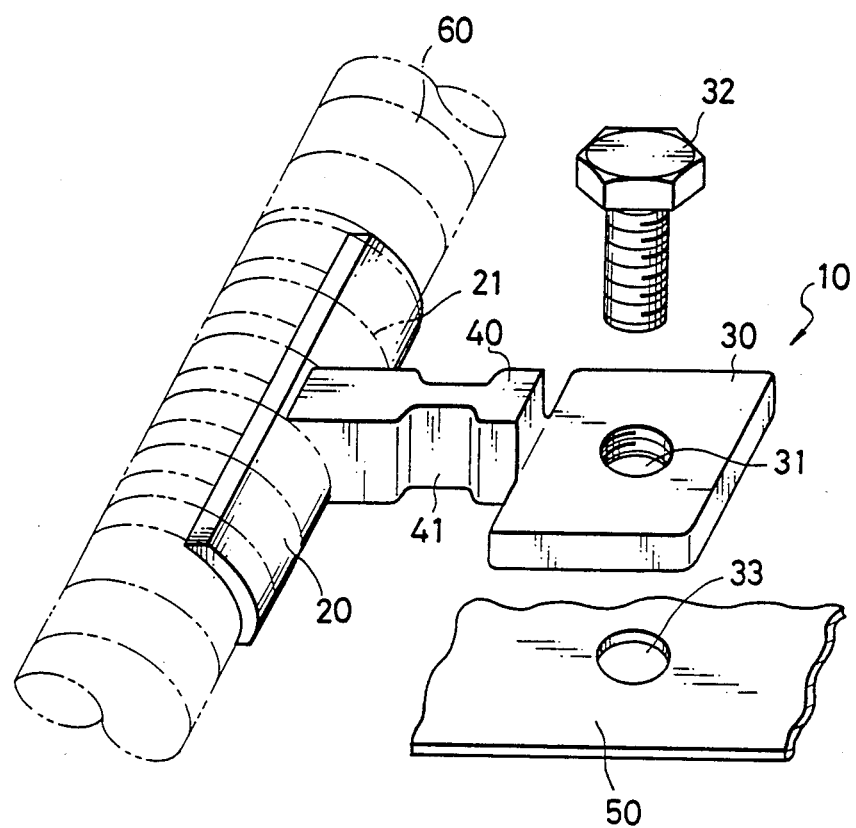
FIG. 1 is a perspective schematic view of a clip according to the invention.

As shown in FIG. 1, the clip of a T-shape generally indicated by reference numeral 10 includes a holder head portion 20 which is adapted to support a wiring harness longitudinally, and a retainer stem portion 30 which is adapted to securely fix the clip in position within its mounting room, both of which portions being integral with each other with a bridging portion 40 formed thereebeteween, and the bridging portion 40 has its middle constricted portion 41 reduced in width, thereby providing a resiliently bendable portion.

The clip 10 is bound tightly to a respective wiring harness 60 with its holder head portion by winding a tape 21 around the two parts. The thus provided assembly is next brought into its mounting room specified according to the wiring design, and the retainer stem portion 30 of the clip is secured to a closure panel constituting the mounting room by bolting 32 through a fixing hole 31 formed on the retainer portion 30 and a further hole 33 on the closure panel 50. Thus the wiring harness 60 is fixed in position.

Figure 2:
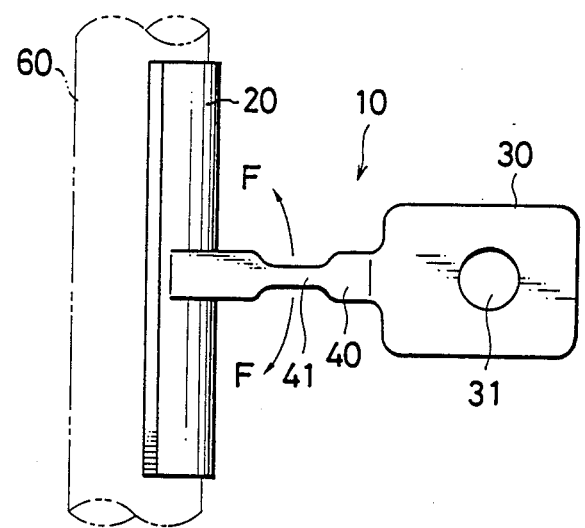
FIGS. 2 and 3 respectively are plan views showing how the FIG. 1 clip is applied into its mounting room through a hole on the closure panel.
Figure 3:
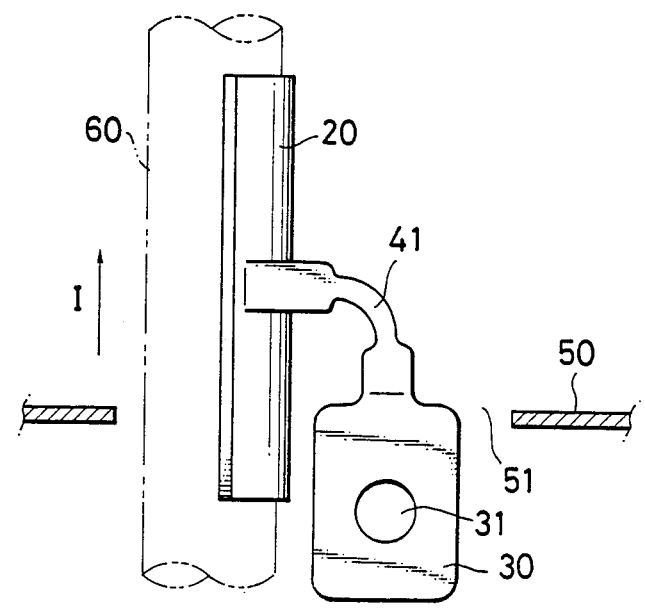

In this process, it is noted that thanks to the constricted portion 41 formed on the bridging portion, the holder 20 or the retainer 30 can easily be bent resiliently in directions of arrows F such as substantially parallel to the holder head portion, as shown in FIG. 2. To enhance this property of bendability, the clip preferably is made by molding of a polymer material, e.g. polyamide ("Nylon") or polypropylene.

Hence, when the wiring harness-clip assembly is brought into its mounting room, the assembly can easily be inserted in a direction of arrow I through a through-hole 51 on the closure panel 50 with the retainer portion 30 being bent temporarily about the constricted portion 41 of the bridging portion 40. As soon as the assembly is positioned as determined, the retainer portion 30 will resiliently restore its original attitude. Then, the retainer 30 and the panel 50 are bound to each other by the fastening bolt 32. Accordingly, the mounting of the wiring harnesses extending to various parts to be electrically powered in the automobile can be achieved easily, efficiently and economically.

The invention is further advantageous in that since the resilient bendable section comprised of the constricted portion 41 can act as a movable part of the clip during the mounting process and further use as well, it can compensate for undesirable displacement of the wiring harness, if any, caused from application of excessive forces upon the tape wound portion of the wiring harness. This obviously prevents occurrence of degradation or damages of the wiring harness 60 which is to be installed in a section of the vehicle structure subject to objectionable vibrations.

Figure 4:
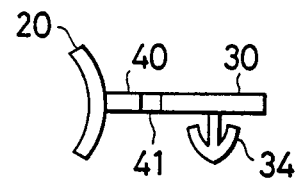
FIG. 4 is a side view showing another embodiment of the invention.

Next, as shown in FIG. 4, the invention also can be practiced by means of an anchor-head type hook 34 instead of the bolting through two fixing holes as described in the preceding embodiments. With this altered embodiment, the assembly may be brought into its mounting room through the hole on the enclosure panel while it being bent at the constricted portion 41 of the bridging portion 40, and fit the hook 34 in a clip-receiving hole formed on the panel. The wiring harness is thus secured in position with ease.

Further, in the above mentioned embodiment, the resiliently bendable portion of the bridging portion 40 of the clip 10 has been described as in the shape of vertical recesses, but that may alternatively be formed as tapered, reduced in thickness of the middle section of the bridging portion, or made hollow, in any case of which equal effects being obtainable.

As is described above, the clip of the present invention having the constricted portion in the middle of the bridging portion can be resiliently bent, and applied into the through-hole on the enclosure panel for the mounting room with the overall transverse dimension being conveniently reduced.

According to the invention clip, therefore, its excellent feature of easy incorporability into the mounting structure assures that those problems as a disadvantage of necessary enlarging the through-hole or an economic drawback of the man-hour for mounting being increased, can totally be eliminated thereby improving the reliability of the clip to a greater extent.

What is claimed is:

1. A clip adapted to support a wiring harness to a support structure comprising:
    a holder head portion for longitudinally gripping the wiring harness;
    a retainer stem portion for securing the clip to the support structure; and
    a flexible bridging portion, including end portions and a flexible portion intermediate the end portions, said bridging portion for connecting the holder head portion to the retaining stem portion, being resiliently bendable from a first position, in which the bridging portion is straight and perpendicular to the gripped wiring harness, to a second position, in which the bridging portion is configured at approximately a 90 (ninety) degree angle, whereby the retaining stem portion may be positioned adjacent to the wiring harness to decrease the overall transverse dimension of the clip during installation of the clip through a hole in the support structure said flexible bridging portion having opposed generally parallel walls establishing an overall thickness dimension from end to end sufficient to rigidly support the holder head portion in a direction perpendicular to the transverse dimension of the clip and said flexible intermediate portion having a reduced thickness in the transverse direction for imparting flexibility thereto.

2. A clip according to claim 1, wherein said flexible intermediate portion is narrower than the rest of the bridging portion thereby establishing a bend point within the bridging portion of the clip.

3. A clip according to claim 2, wherein said flexible intermediate portion of the bridging portion comprises vertical recesses formed on opposite sides thereof.

4. A clip according to claim 2, wherein said flexible intermediate portion of the bridging portion comprises a tapering profile.

5. A clip according to claim 1, wherein said clip is made of a plastic material.

6. A clip according to claim 5, wherein said plastic material is polyamide.

7. A clip according to claim 5, wherein said plastic material is polypropylene.

8. A clip according to claim 1, wherein said retainer stem portion comprises an anchor-head type hook for securing the clip to the support structure.

9. A clip made of a plastic material and adapted to support a wiring harness from a supporting structure, comprising
    a holder head portion adapted to grip and retain the wiring harness along a longitudinal axis;
    a retainer stem portion adapted to be attached to the supporting structure in a narrowly closed space; and
    a bridging portion including end portions and a flexible bridging portion means intermediate the end portions for imparting flexibility to the bridging portions in a transverse direction, and a generally rigid bridging portion means extending from end portion to end portion for maintaining rigidity of the bridging portion in a direction perpendicular to the transverse direction, said bridging portion connecting said holder head portion and said retainer stem portion whereby said bridging portion is flexible so as to be bent in a direction substantially parallel to said said longitudinal axis.

10. A clip according to claim 9, wherein said plastic material is polyamid.

11. A clip according to claim 9, wherein said plastic material is polypropylene.

12. A clip according to claim 9, wherein said retainer stem portion comprises an anchor-head type hook to be fastened on the supporting structure.

* * * * *